United States Patent
Blohmann et al.

(10) Patent No.: US 6,371,354 B2
(45) Date of Patent: Apr. 16, 2002

(54) APPARATUS FOR THE TEMPERATURE REGULATION OF ELECTRONIC COMPONENTS

(75) Inventors: Johann Alfred Blohmann, Villingen; Rolf Diehm, Wertheim; Rudolf Ullrich, Kreuzwertheim, all of (DE)

(73) Assignee: SEHO Systemtechnik GmbH, Kreuzwertheim (DE)

( * ) Notice: Subject to any disclaimer, the term of this patent is extended or adjusted under 35 U.S.C. 154(b) by 0 days.

(21) Appl. No.: 09/759,201

(22) Filed: Jan. 16, 2001

Related U.S. Application Data

(62) Division of application No. 09/422,656, filed on Oct. 22, 1999, now Pat. No. 6,223,975.

(30) Foreign Application Priority Data

Oct. 8, 1999 (DE) .......................................... 199 48 606

(51) Int. Cl.[7] .............................................. B23K 31/02
(52) U.S. Cl. ....................................................... 228/9
(58) Field of Search ......................... 228/232, 9, 49.5; 414/157, 331.17, 172, 176; 432/132, 126, 137, 122, 120, 239, 246; 392/416, 417, 408

(56) References Cited

U.S. PATENT DOCUMENTS

| | | |
|---|---|---|
| 4,034,661 A * | 7/1977 | Boosalis et al. |
| 4,389,562 A | 6/1983 | Chadoir |
| 5,158,224 A | 10/1992 | Baker et al. |
| 5,192,582 A | 3/1993 | Liedke et al. |
| 5,404,894 A | 4/1995 | Shiraiwa |
| 5,449,883 A | 9/1995 | Tsuruta |
| 5,507,639 A | 4/1996 | Monoe |
| 5,516,283 A | 5/1996 | Schrems |
| 5,616,264 A | 4/1997 | Nishi et al. |
| 5,618,351 A | 4/1997 | Koble, Jr. et al. |
| 5,679,168 A | 10/1997 | Porter et al. |
| 5,801,362 A | 9/1998 | Pearlman et al. |
| 5,820,266 A | 10/1998 | Fedak |
| 5,977,592 A | 11/1999 | Willert-Porada et al. |
| 5,997,286 A | 12/1999 | Hemasath et al. |

\* cited by examiner

*Primary Examiner*—Tom Dunn
*Assistant Examiner*—Jonathan Johnson
(74) *Attorney, Agent, or Firm*—Banner & Witcoff, Ltd.

(57) ABSTRACT

An apparatus for the temperature regulation processing of electronic components such as semiconductor circuits, printed circuit boards and the like comprises a temperature regulated housing through which the components are conveyed on carriers. The carriers enter through an inlet slot in the housing provided with temperature regulating members and are conveyed onto a magazine and then out through an outlet slot opposite the inlet slot once processing is complete. Inside the housing, the carriers are loaded on a progressively loaded magazine provided with adjacently arranged holders. Once all the holders are loaded, the magazine is filled and in an end position. The magazine is then displaced to its starting position in a fast reverse run. A new carrier is conveyed in through the inlet slot thereby causing the temperature regulated carrier occupying the holder to be conveyed out through the outlet slot.

4 Claims, 6 Drawing Sheets

APPARATUS FOR THE TEMPERATURE REGULATION OF ELECTRONIC COMPONENTS

CROSS REFERENCE TO RELATED APPLICATION

Figure 1:
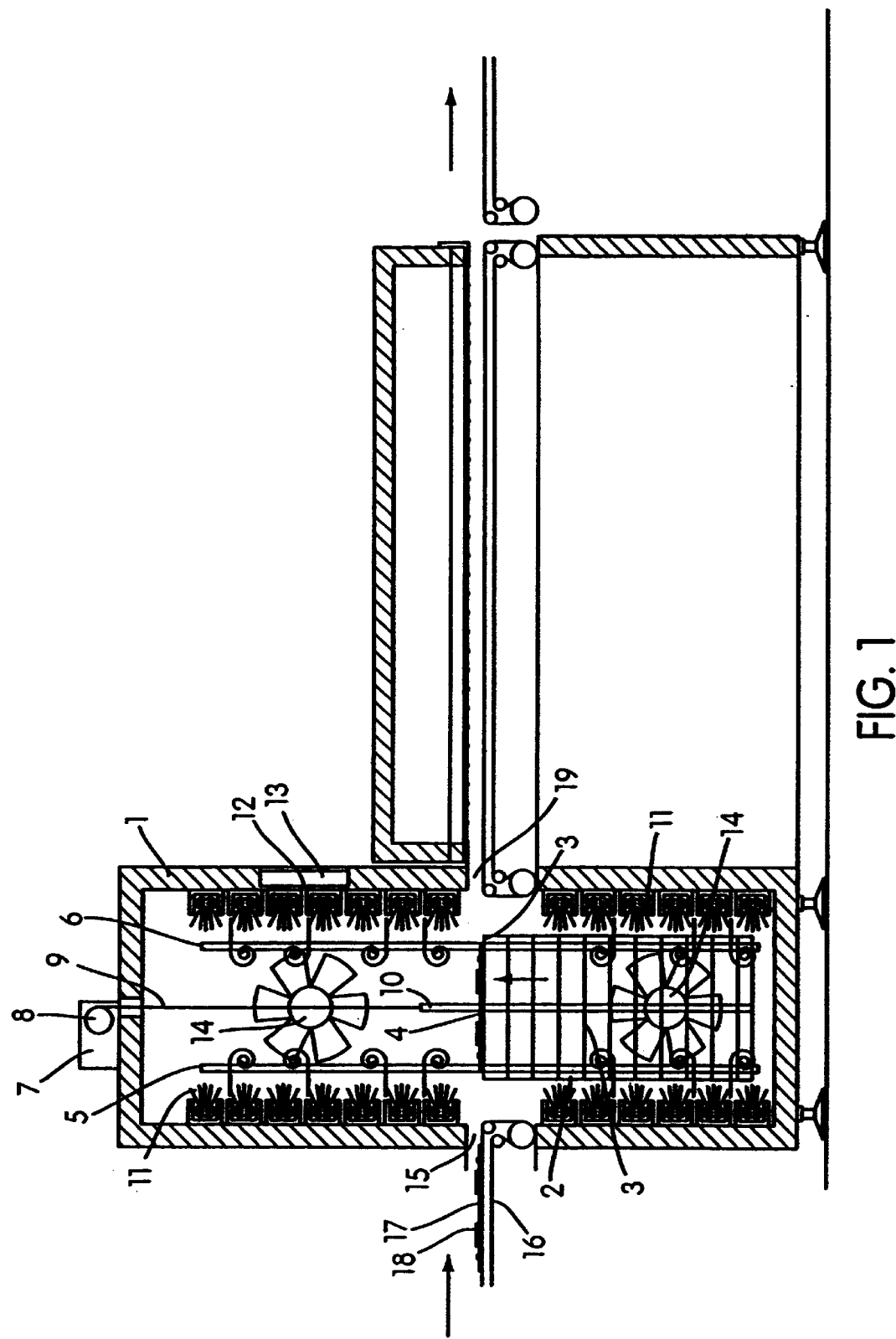

This application is a divisional of application Ser. No. 09/422,656, filed Oct. 22, 1999 now U.S. Pat. No. 6,223,975.

The invention relates to a method, and an apparatus for carrying it out, for the temperature regulation of components, for example semiconductor circuits, printed circuit boards and the like, in which the components are conveyed on carriers through an inlet slot into a temperature-regulating housing provided with temperature-regulating members and are conveyed out through an outlet slot opposite the inlet slot.

An apparatus which operates according to this method is disclosed in DE-A 4020920. This apparatus is a continuous furnace for preheating workpieces that are to be fed for further processing. This continuous furnace contains two transport systems each configured after the manner of two paternosters which are arranged next to one another and contain circulating belts guided via an upper and a lower deflection roller. In this case, the direction of rotation of the deflection rollers is chosen such that the mutually facing strand sides of the circulating belts each run in the same direction, with the result that accommodating parts fitted to the circulating belts execute either an upwards movement or downwards movement in the region between two circulating belts. On account of the arrangement of two transport systems of this type one behind the other, that is to say with coaxial axes of the upper deflection rollers and lower deflection rollers, and a driving direction of the deflection rollers in one transport system opposite to the driving direction in the other transport system, the result is, for shaped metal sheets inserted into one transport system in each case and serving to carry the workpieces to be treated, that the said shaped metal sheets are transported upwards, transferred from the upwards-transporting transport system to the downwards-transporting transport system and are transported downwards in the latter transport system. In this case, the upwards-transporting transport system is loaded through an inlet slot, situated in its lower region, in the continuous furnace and the shaped metal sheets are discharged via an outlet slot in the lower end of the downwards-transporting transport system, the inlet and outlet slots lying opposite one another. To enable the transport via the two transport systems and from one transport system to the other to proceed without any disruptions, the movement of the transport systems is cyclically timed in the corresponding manner.

Furthermore, U.S. Pat. No. 5,158,224 discloses a heating housing for preheating circuit boards to be soldered, which heating housing uses a transport system after the manner of a transport system in the document discussed above. The circuit boards are inserted into the interior of the housing through a slot situated in the lower region of the temperature-regulating housing and, in the process, are gripped by the two opposite transporting belts of its single transport system, which then transports the circuit boards upwards until the latter reach the level of an outlet slot which is situated in the upper region of the housing and from which the circuit boards, which have been heated in the interior of the housing, are then discharged.

The invention is based on the object of simplifying the procedure of the method underlying the abovementioned continuous furnace. This is done according to the invention by virtue of the fact that the carriers are accommodated by a magazine in the housing, which magazine is provided with adjacently arranged holders and, after the first holder has been loaded, is displaced progressively in one direction from a starting position into successive accommodating positions in which the individual holders of the magazine are loaded one after the other, whereupon, after all the holders have been loaded, the magazine thus filled is displaced, from the end position that has been reached in the process, back to its starting position in a fast reverse run in the opposite direction, in which starting position a carrier is conveyed in through the inlet slot and, with the magazine having been filled, the first temperature-regulated carrier in the magazine is conveyed out through the outlet slot and, with the successive loading of the individual holders of the magazine, the individual temperature-regulated carriers are conveyed out successively, a temperature-regulated carrier being replaced by a non-temperature-regulated carrier and the residence time of the carriers in the magazine corresponding, identically for all of the carriers, to the period of time between two reverse runs, until all the holders of the magazine are loaded again in the end position reached by the said magazine, whereupon, after the reverse run of the magazine to the starting position, the magazine is progressively loaded again.

As this method proceeds, a back and forth movement, or up and down movement, is produced within the temperature-regulating housing without any deflections and without a transfer function having to be performed between the two directions of movement, a single simple displacement mechanism being required for the back and forth movement.

In this case, each carrier whose temperature is to be regulated is acted upon uniformly for a specific period of time, namely their residence time in the temperature-regulating housing, defined by the period of time between two reverse runs.

The displacement of the magazine in the temperature-regulating housing is advantageously effected in the vertical direction. This arrangement results in a relatively small installation area for the temperature-regulating housing, since the latter merely requires a vertical space in which a single up and down movement takes place. It is possible to configure this up and down movement from the starting position to the end position either from the bottom to the top or from the top to the bottom. Displacing the magazine from the starting position to the end position from the bottom to the top facilitates the fast return movement of the filled magazine from the end position back to the starting position, namely from the top to the bottom, since the force of gravity assists this fast movement.

It shall be pointed out, however, that the displacement of the magazine can also be effected in the horizontal direction if this appears to be necessary for the loading of the temperature-regulating housing and the unloading of the temperature-regulated carriers.

The apparatus for carrying out the method according to the invention is expediently configured in such a way that the temperature-regulating housing is approximately twice as long as the magazine and, in its central region, has the inlet slot and the outlet slot opposite, that the magazine is provided with a displacement mechanism for progressively displacing it into a position where its holders are in each case aligned with the inlet and outlet slots, and that the temperature-regulating housing has temperature-regulating members which bring the interior of the housing to a temperature that can be set in such a way that the components assume a desired temperature during the residence time.

This configuration results in an opening in the temperature-regulating housing for the inlet slot and the outlet slot approximately in the centre of the housing, which is favourable for the thermal balance of the temperature-regulating housing. Furthermore, the guidance of the magazine in the temperature-regulating housing requires merely a single displacement mechanism which acts in a straight line and effects the movement of the magazine both in the upwards direction and in the downwards direction. The temperature-regulating members accommodated in the housing ensure that, with consideration for the residence time of the components which is defined by the displacement mechanism, the temperature to be assumed by the components can be set without difficulty by means of an adjustable temperature of the temperature-regulating members.

The apparatus according to the invention can advantageously be used for heating printed circuit boards upstream of the melting zone of a soldering installation, the temperature-regulating members being formed by heaters. However, it is also possible to arrange the apparatus downstream of the melting zone of a soldering installation, for which purpose the temperature-regulating members may then be formed by coolers.

Since the apparatus is intrinsically a closed structure, it is possible to arrange a plurality of such apparatuses adjacently to one another and to connect their inlet and outlet slots to one another. This makes it possible to realize individual and step-by-step temperature regulation of components, in particular the curing of potting compositions in connection with semiconductor circuits.

Figure 2:
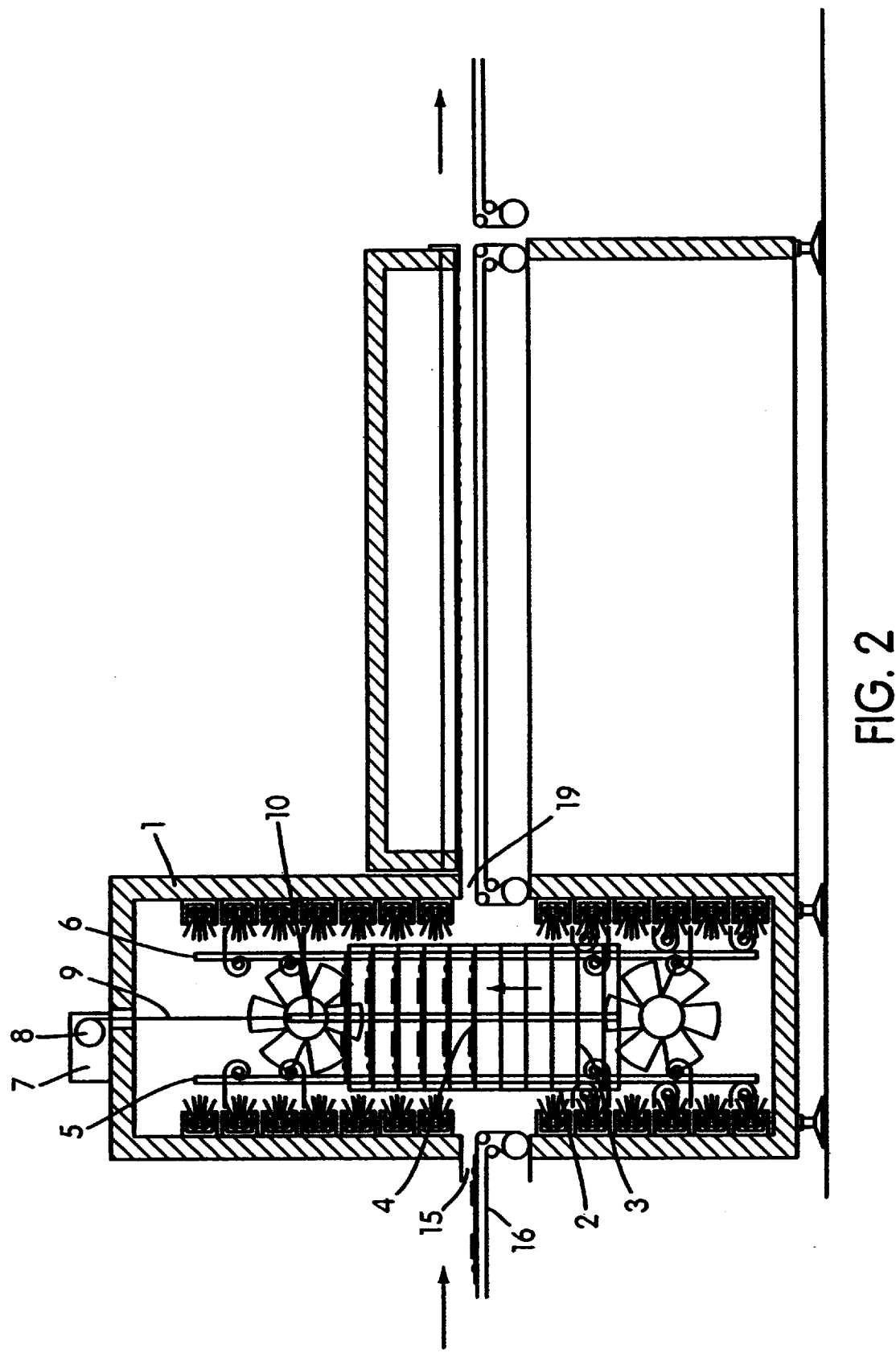
Figure 3:
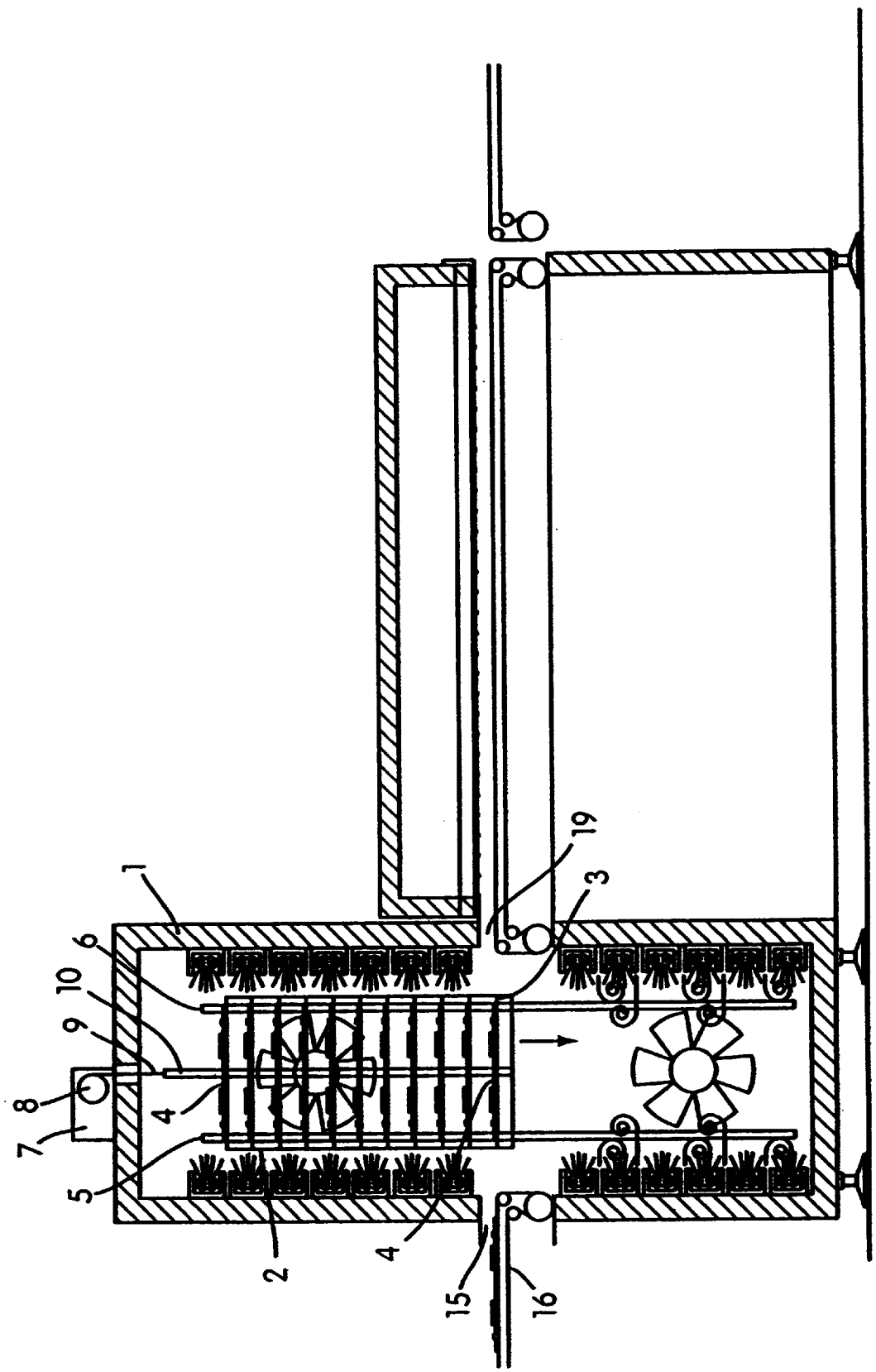
Figure 4:
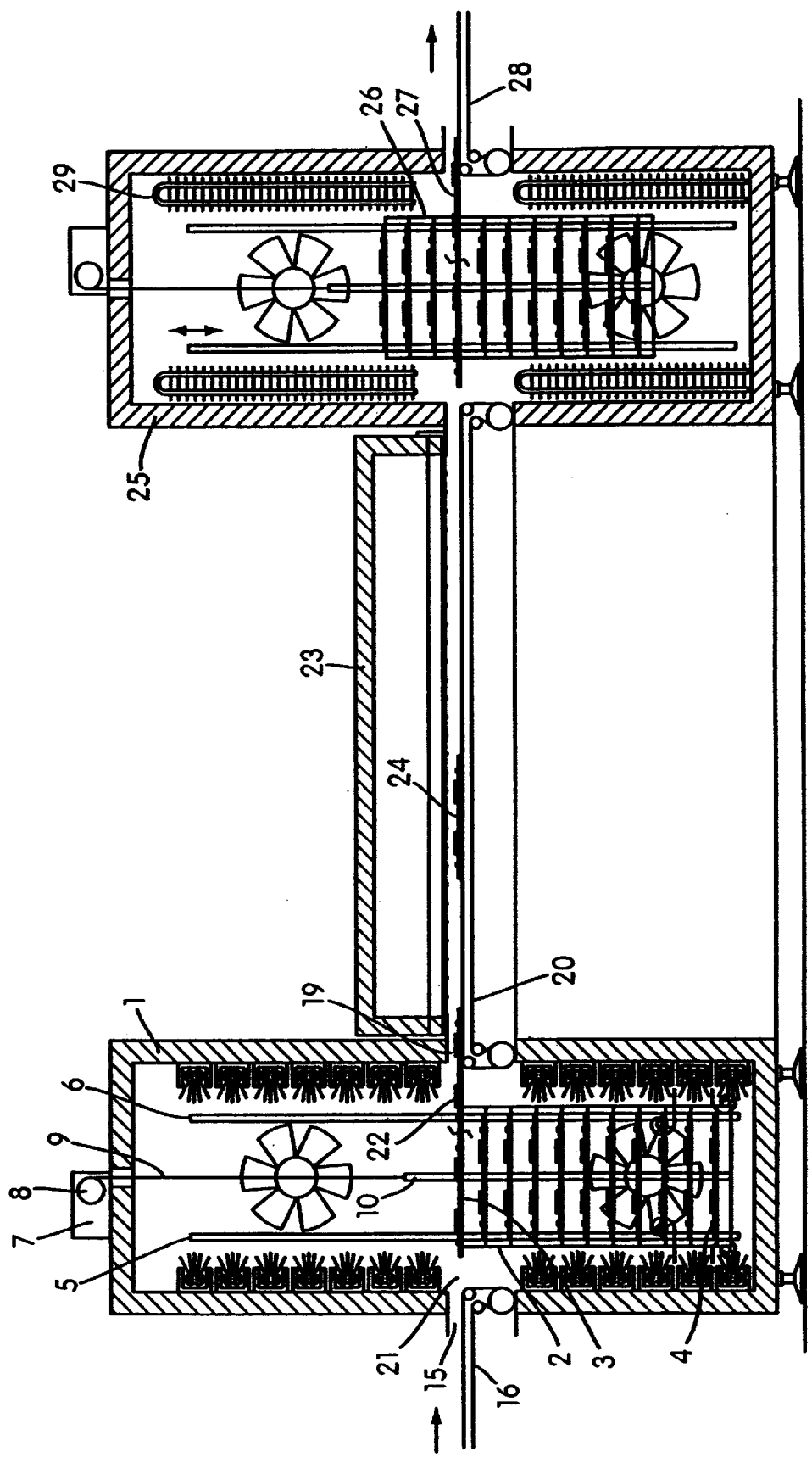
Figure 5:
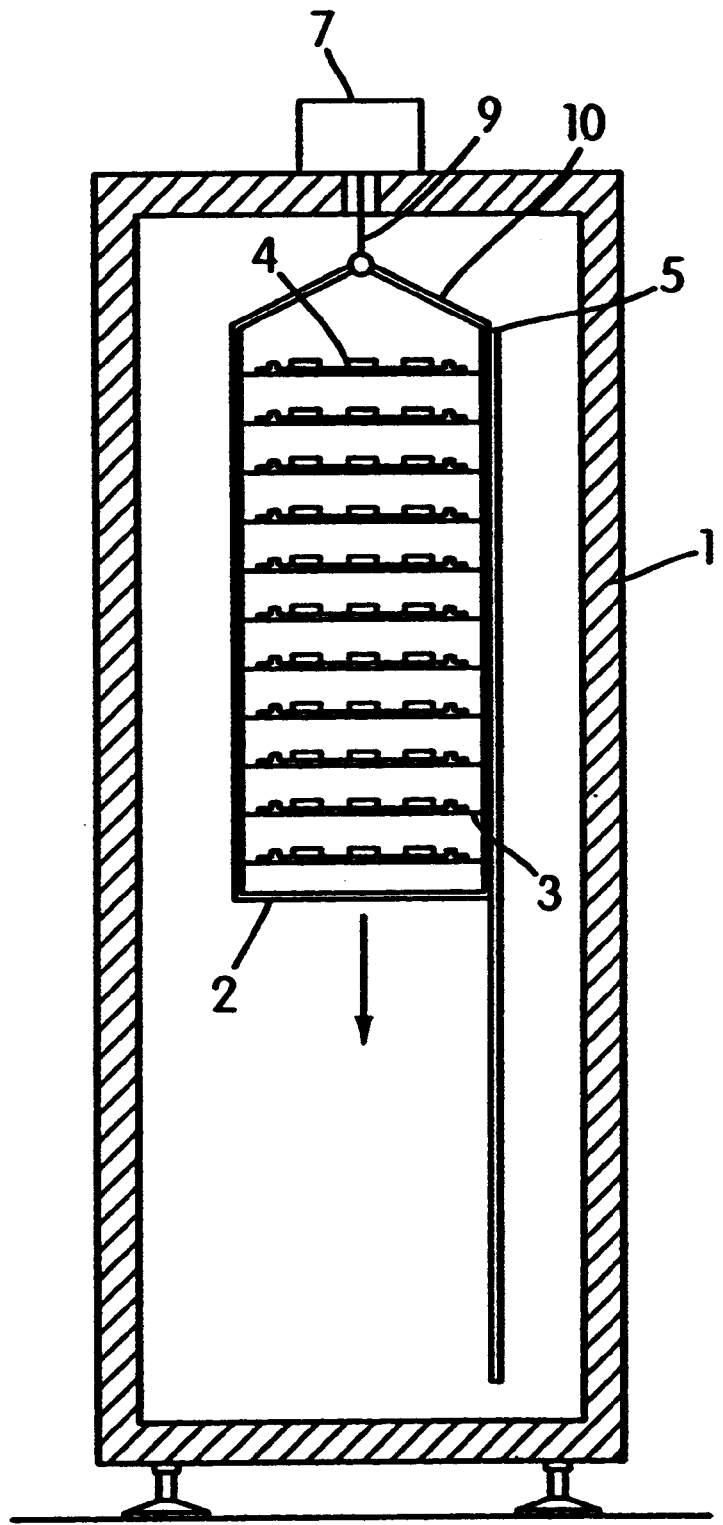
Figure 6:
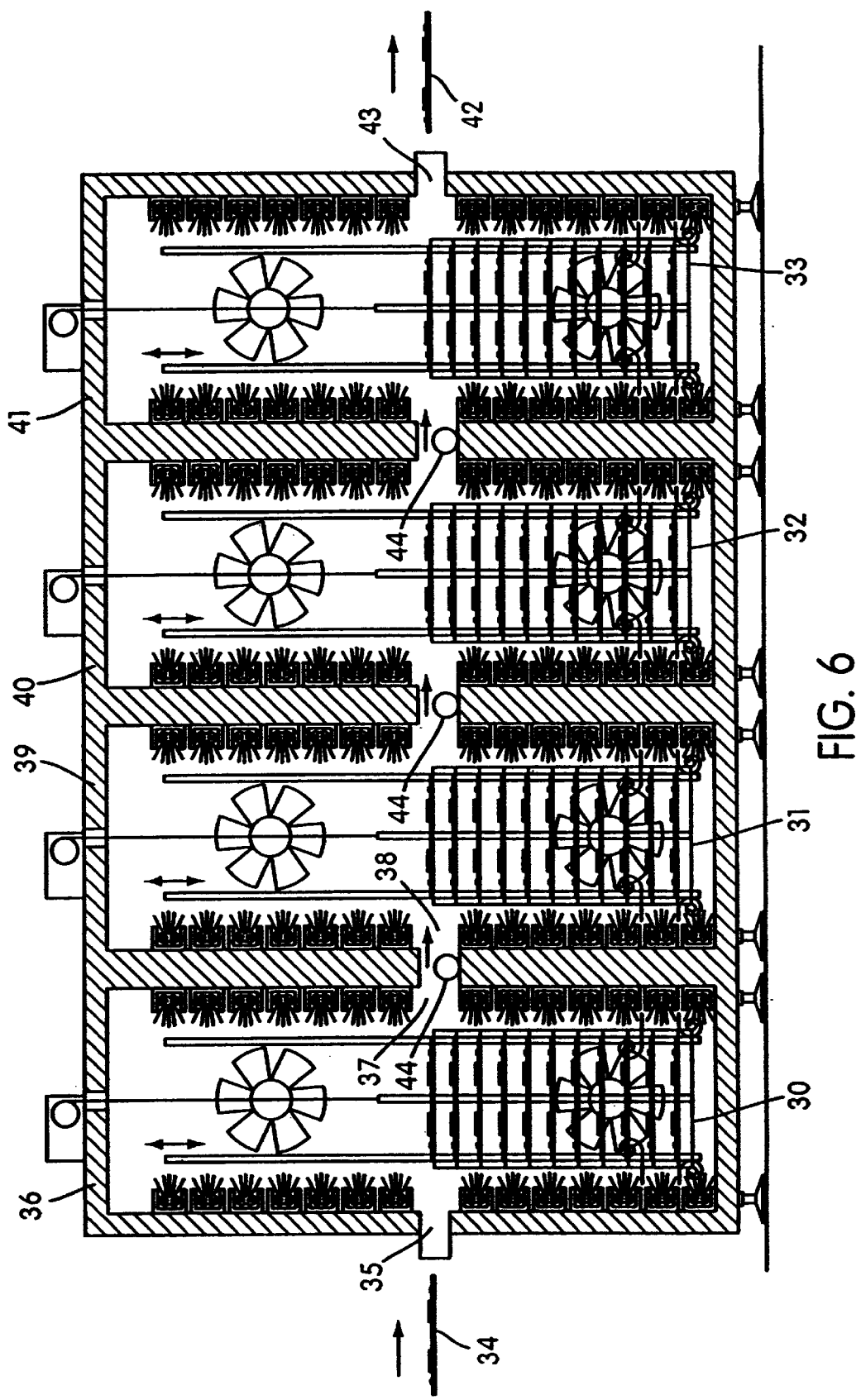

Exemplary embodiments of the invention are illustrated in the figures, in which:

FIG. 1 shows a side view of a temperature-regulating housing with magazine which is arranged upstream of a melting zone of a soldering installation, to be precise in the starting position of the magazine, FIG. 2 shows the same arrangement with a raised magazine, which is partly loaded with carriers, FIG. 3 shows the same arrangement in the end position of the magazine, in which the latter is completely filled and is thus faced directly with the fast reverse displacement into the starting position, FIG. 4 shows a soldering installation with a temperature-regulating housing arranged upstream and downstream of it, FIG. 5 shows the temperature-regulating housing in the position in accordance with FIG. 3, but in a side view turned through 90°, and FIG. 6 shows an arrangement of a plurality of temperature-regulating housings directly next to one another with interconnected inlet and outlet slots.

FIG. 1 illustrates the temperature-regulating housing 1 with a relatively thick temperature-insulating wall, the magazine 2 being accommodated in the said housing in a manner allowing it to be longitudinally displaced. The magazine 2 is provided with individual holders 3 arranged one above the other at the same distance from one another, the said holders serving for accommodating individual carriers 4. In accordance with FIG. 1, the carrier 4 rests on the topmost holder 3. The magazine 2 is guided by the guide rails 5 and 6 fixed to the wall of the temperature-regulating housing 1. In order to move the magazine 2 vertically along the guide rails 5 and 6 in the temperature-regulating housing 1, provision is made of the displacement mechanism which is in this case designed as a lifting mechanism 7 and has the take-up reel 8 on which the tension cable 9 can be wound. The tension cable 9 is hung on the clip 10, the configuration of which is explained in more detail in connection with FIG. 5. By reeling up the tension cable 9, the magazine 2 is raised until it reaches its end position shown in FIG. 3, which will be discussed in further detail below.

For heating its interior, the temperture-regulating housing 1 is provided with heaters designed as heating radiators 11 and ventilation slots 12. Hot air is fed to the ventilation slots 12 via ducts 13 accommodated in the wall of the temperature-regulating housing 1, which provide for heating of the interior of the temperature-regulating housing 1 in addition to the heating radiators 11. As is shown, a relatively large number of heating radiators 11 and ventilation slots 12 are accommodated over the inner wall of the temperature-regulating housing 1, thereby producing highly uniform soaking for the interior of the temperature-regulating housing 1. In order that, in its heated state, the air situated in the interior of the temperature-regulating housing 1 is well distributed throughout the interior, the two circulating air blowers 14 are additionally provided.

The magazine 2 is provided for loading with the carriers 4, one of which, as already explained above, rests on the topmost holder 3. The individual carriers are conveyed into the temperature-regulating housing 1 through the inlet slot 15, to be precise with the aid of the transporting belt 16 on which, in accordance with the illustration in FIG. 1, the carrier 17 with semiconductor circuits 18 fitted thereon already rests. With the forward movement of the transporting belt 16, the carrier 17 is conveyed through the inlet slot 15 towards the magazine 2, which is thus loaded with a carrier, as is the case with the carrier 4.

In accordance with the method of the invention, the magazine 2 is then progressively raised by means of the lifting mechanism 7, to be precise in such a way that a holder 3 in each case arrives at a position aligned with the inlet slot 15, which forms the accommodating position. In this way, from the transporting belt 16, the magazine 2 can be progressively brought to the filled state in which all the holders 3 of the magazine 2 are loaded with a carrier 4.

FIG. 2 illustrates the arrangement in accordance with FIG. 1 in a position in which the magazine 2 is partly loaded with carriers 4. This loading of the magazine 2 effected by the conveyer belt 16 then continues progressively until the magazine 2 is completely filled.

This state in which the magazine 2 occupies its end position is illustrated in FIG. 3. With this end position having been reached, a carrier 4 had been fed to the magazine 2 for its bottommost holder 3. The magazine 2, which is thus completely filled, is then subsequently displaced back again, in a fast reverse run, to the starting position illustrated in FIG. 1, this requiring only a short period of time, for example a few seconds.

Once the starting position of the magazine 2 has been reached again, to be precise now with a filled magazine, the latter occupies the position illustrated in FIG. 4, which now serves for conveying the carriers 4 that have been subjected to temperature regulation in the magazine 2 out of the magazine 2 and the temperature-regulating housing. This operation is illustrated in FIG. 4. If a new carrier 21 is fed to a holder 3 aligned with the inlet slot 15, then this causes the carrier 22 lying on the relevant holder to be conveyed out, the said carrier being conveyed out through the outlet slot 19 opposite the inlet slot 15. In this case, the said carrier 22 passes via the transporting belt 20, which follows the temperature-regulating housing 1, into further processing stations of a soldering installation 23, which will be discussed in further detail below. This process of carriers being conveyed into and out of the magazine 2 proceeds, in principle, in the same way as the filling of the magazine 2 was outlined in connection with FIGS. 1 and 2, although now, once the magazine 2 has been filled (see FIG. 4), the carriers situated in the magazine 2 are individually conveyed away one after the other by carriers that are newly conveyed in, as is indicated in the case of the carrier 22. This process proceeds progressively as in the case of the filling of the magazine 2 in accordance with FIGS. 1 and 2, in each case a new carrier ensuring that a carrier that has already been subjected to temperature regulation is conveyed out, that is to say that, upon each of these successive steps, a temperature-regulated carrier 22 is replaced by a non-temperature-regulated carrier 21. This process proceeds until the magazine 2 has reached its end position in accordance with FIG. 3, in which the magazine 2 is completely filled with non-temperature-regulated carriers and all the temperature-regulated carriers that were previously situated in the magazine have been conveyed out. This results in the same residence time in the temperature-regulating housing 1 for each carrier whose temperature is to be regulated, namely a period of time which corresponds to two reverse runs of the magazine 2, that is to say the transition from the position in FIG. 3 to the position in accordance with FIG. 1, since there is available for each carrier, apart from the fast reverse run of the magazine 2, in each case a period of time for the temperature regulation which is composed of the number of step times which passes from when a carrier is conveyed in until it is conveyed out, this requiring in each case as many steps as the magazine has holders.

FIG. 4 illustrates, moreover, how the carriers 22 that have been conveyed out of the temperature-regulating housing 1 pass into the region of a soldering installation 23, which is a known assembly in which the solder is melted by an appropriate short temperature increase. By means of the transporting belt 20, the carriers 22 and 24 are not only taken over through the outlet slot 19, but also transported through the soldering installation 23 and finally pass, at the end of the soldering installation 23, into a further temperature-regulating housing 25, in which the carriers 24 with components situated thereon are cooled as required. Accommodated in the temperature-regulating housing 25 is the same mechanism for the back and forth movement of a magazine 26, which is loaded with individual carriers in the same way as described in connection with the temperature-regulating housing 1, the carriers 27 that have already been subjected to temperature regulation then being conveyed out of the temperature-regulating housing 25 and taken over by a further transporting belt 28 for further processing. In this case, the same process of the magazine 26 being raised and pushed back takes place inside the temperature-regulating housing 25, so that, with regard to these processes, reference may be made to the explanation concerning FIGS. 1 to 3. In a departure from the configuration of the temperature-regulating housing 1, the temperature-regulating housing 25 is provided with coolers 29, which ensure that the carriers, together with the components that they carry, are cooled to the temperature required for further processing.

FIG. 5 shows the temperature-regulating housing 1 with a filled magazine in accordance with the illustration in FIG. 3, to be precise turned through 90° by comparison with the latter. In this case, the temperature-regulating members illustrated in FIG. 3 are omitted for reasons of simplifying and imparting clarity to the illustration. In accordance with FIG. 5, the magazine 2 is suspended from the tension cable 9 via the clips 10. The clips 10 merge with the magazine 2 and thus form the link between the magazine 2 and the tension cable 9. FIG. 5 also illustrates the guide rail 5; the guide rail 6 in accordance with FIG. 3 is concealed by the guide rail 5 in the view in accordance with FIG. 5. The two guide rails 5 and 6 suffice for guiding the magazine 2 during its up and down movement.

FIG. 6 illustrates a plurality of temperature-regulating housings with magazines 30, 31, 32 and 33 that can be displaced in them in the sense of the above explanations, in which the respective inlet and outlet slots are interconnected. By this means, carriers can be conveyed into the first temperature-regulating housing 36 through the inlet slot 35 of the latter and, after temperature regulation, can be conveyed further through the outlet slot 37 of the said temperature-regulating housing, which outlet slot simultaneously forms the inlet slot 38 of the temperature-regulating housing 39. In this way, after respective temperature regulation in the preceding temperature-regulating housings, the carriers can be conveyed through further temperature-regulating housings 41 and 41 configured correspondingly until, finally, the carriers 42 are transported out through the outlet slot 43 of the last temperature-regulating housing 41. The transfer from one temperature-regulating housing to the other is expediently effected by transfer rollers 44 on which the carriers which are conveyed from temperature-regulating housing to temperature-regulating housing rest and can be conveyed into the next temperature-regulating housing without difficulty on account of the rotation of the transfer rollers 44. As shown in FIG. 6, the individual temperature-regulating housings can in this case have their walls unified in the region where they butt against one another. This is not a requirement, however; individual temperature-regulating housings each provided with a complete wall can, of course, be placed against one another.

The individual temperature-regulating housings 36 to 41 each permit a separate, individual treatment of the carriers that are guided through together with the components carried by the said carriers, for example beginning with relatively weak heating, which then increases via the succeeding temperature-regulating housings 39 and 40 and finally decreases again via the temperature-regulating housing 41. It goes without saying, however, that any other step-by-step temperature regulation is also possible, depending on how the heating in the individual temperature-regulating housings is chosen. In particular, a treatment of this type is favourable in the context of curing potting compositions of semiconductor circuits, which have to undergo a sustained thermal process lasting up to a number of hours for that purpose.

The individual temperature-regulating housings which are illustrated in the figures discussed above can be controlled in a known manner by means of an electronic control system, the latter not being part of the subject-matter of the present invention, however. Such electronic control systems for processes of whatever complexity are known and can readily be used as prior art within the scope of the present invention.

What is claimed is:

1. An apparatus for temperature regulated processing of electronic components comprising a temperature-regulated housing (1), an inlet slot (15) and an outlet slot (19), said housing containing a magazine (2) provided with adjacently arranged holders (3) for retaining components (18) thereon, said magazine adapted to move said holders from a starting position to an end position and then return to said starting position rapidly, said apparatus characterized in that the temperature-regulating housing (1) is approximately twice as long as the magazine (2) and, in its central region, has the inlet slot (15) and the outlet slot (19) opposite, in that the magazine (2) is provided with a displacement mechanism (7, 8, 9) for progressively displacing it into a position where its holders (3) are in each case aligned with the inlet and outlet slots (15, 19) in an accommodating position, and in that the temperature-regulating housing (1) has temperature-regulating members (11, 12) which bring the interior of the housing (1) to a temperature that can be set in such a way that the components (18) assume a desired temperature during the residence time.

2. Apparatus according to claim 1, characterized in that it is arranged upstream of the melting zone of a soldering installation (23) and the temperature-regulating members are formed by heaters (11, 12).

3. Apparatus according to claim 1, characterized in that it is arranged downstream of the melting zone of a soldering installation (23) and the temperature-regulating members are formed by coolers (29).

4. Apparatus according to claim 1, characterized by a plurality of adjacently arranged temperature-regulating housings (36, 39, 40, 41), whose inlet and outlet slots (37, 38) are interconnected.

* * * * *